United States Patent [19]

Hayashi et al.

[11] Patent Number: 4,548,775
[45] Date of Patent: Oct. 22, 1985

[54] METHOD FOR PRODUCTION OF THERMOPLASTIC RESIN FOAMS

[75] Inventors: Motoshige Hayashi; Toshiro Kobayashi, both of Nara, Japan

[73] Assignee: Sekisui Kaseihin Kogyo Kabushiki Kaisha, Nara, Japan

[21] Appl. No.: 568,545

[22] Filed: Jan. 5, 1984

[51] Int. Cl.⁴ ............................................. B29D 27/00
[52] U.S. Cl. .................... 264/45.5; 264/46.1; 264/51; 264/338; 264/DIG. 14; 425/325; 425/404; 425/817 C
[58] Field of Search ................. 264/45.5, 53, 51, 46.1, 264/DIG. 14, 338; 425/817 C, 325, 404

[56] References Cited

U.S. PATENT DOCUMENTS 3,720,572  3/1973  Soda et al. .................... 264/46.1 X
3,867,493  2/1975  Seki ................................ 264/45.5 X
4,192,839  3/1980  Hayashi et al. .................. 264/45.5

FOREIGN PATENT DOCUMENTS 51-33585   9/1976  Japan .
54-35231  11/1979  Japan .

Primary Examiner—Philip Anderson
Attorney, Agent, or Firm—Armstrong, Nikaido, Marmelstein & Kubovcik

[57] ABSTRACT

A method of producing thermoplastic resin foams is disclosed. The method comprising extruding an expandable resin through a plurality of holes bored in a die in the inside of a frame fitted to the extrusion end surface of the die in an adjacent relation therewith and fusing together the thus-extruded materials while they are expanded and still softened, wherein the inner surfaces of the frame are inclined at an angle of inclination ranging between 5° and 30°, so that the cross-sectional area of the frame is increased toward the outer end thereof, and the extruded materials are fused together while kept in contact with the inner surfaces of the frame.

8 Claims, 12 Drawing Figures

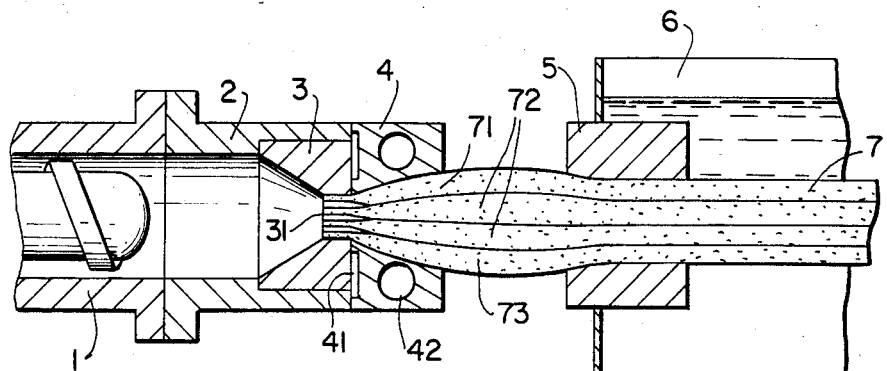
FIG. 1
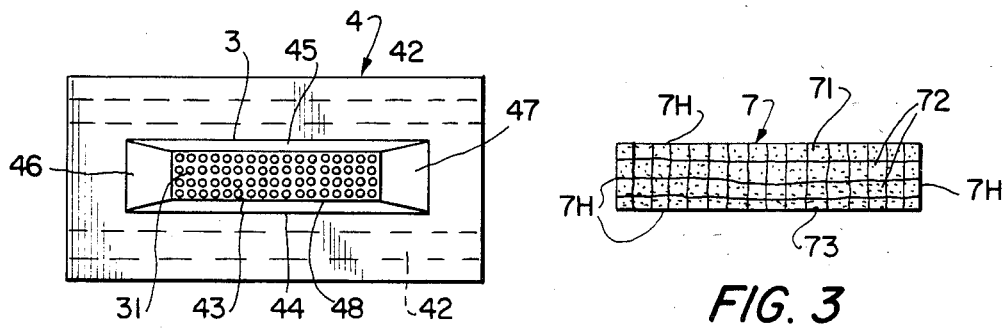
FIG. 2
FIG. 3
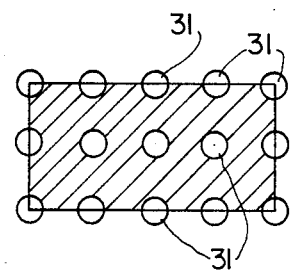
FIG. 4
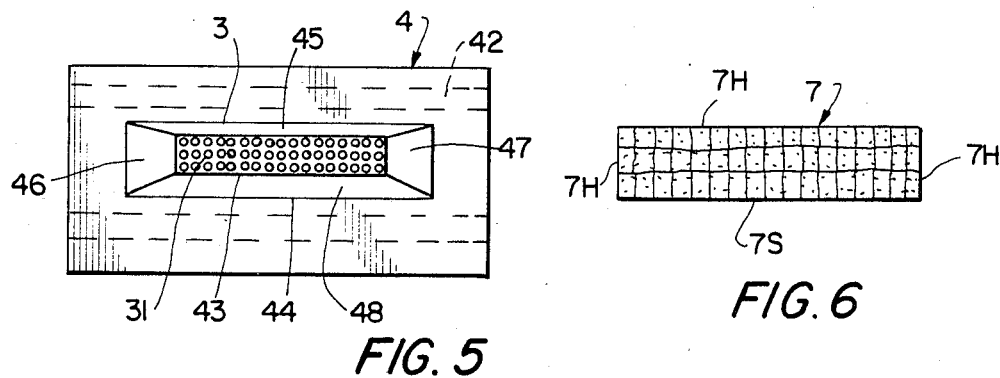
FIG. 5
FIG. 6

METHOD FOR PRODUCTION OF THERMOPLASTIC RESIN FOAMS

FIELD OF THE INVENTION

The present invention relates to a method for production of thermoplastic resin foams. More particularly, the present invention relates to an improved method of producing thermoplastic resin foams which comprises expanding an expandable resin by extruding it through a plurality of holes and fusing together the thus-extruded expanded materials while they are still soft.

BACKGROUND OF THE INVENTION

It is known that a foam is produced by extruding an expandable resin through a plurality of holes bored in a die to form expanded materials and fusing together the expanded materials while they are still soft. With this method only, however, it is not possible to produce a foam having a skin layer of high density. The surface of a foam not having such a skin layer of high density is easily scratched.

Hence, a method has been proposed to provide a skin layer of high density on the surface of a foam. The feature of this method resides in that a frame surrounding extrusion holes is fitted to the extrusion end surface of a die, and extruded materials are passed through the frame where they are expanded and fused together. If such a frame is provided and extruded materials are passed through the frame while passing a cooling medium through the interior of the frame, a foam which has a skin layer of high density on the entire surface thereof can be produced.

The above-proposed method is described in, for example, Japanese Patent Publication No. 35231/79. This method utilizes a frame in which the inner surfaces facing extruded materials are composed of planes extruding in parallel with each other in the extrusion direction. In more detail, the inner surfaces of the frame are formed by straight lines vertical to the extrusion end surface of a die. However, experiments have revealed that if a frame as described above is used, a skin layer of high density can be formed on the surface of a molded product, but when a number of extruded materials are fused together, big voids are formed in the interior of the molded product and, thus, it is difficult to produce a high quality foam. The reason is considered that when a number of extruded materials are fused together to form a molded product having a large cross-sectional area, gas resulting from a foaming agent is prevented from passing through the extruded materials and remains therebetween.

It has also been proposed to use a frame whose cross-sectional area is increased toward the outer end, in a method of molding a foam as described above. Japanese Patent Publication No. 33585/76, for example, discloses a frame having such inner surfaces whose cross-sectional area increases toward the outer end. In more detail, the cross-section of the frame is circular. A frame having such inner surfaces, however, fails to form a skin layer of high density over the entire surface of a foam. Hence, it has been desired to develop a convenient method to provide a high density skin layer uniformly over the entire surface of a foam.

Giving attention to the fact that conventional frames are such that the inner surfaces are extended in parallel with each other in the direction of extrusion, or the cross-sectional area is merely increased toward the outer end, studies have been made on the relation between the inclination of inner surfaces of a frame and the structure or properties of a foam as produced using the frame. As a result, it has been found that in order to provide a skin layer of high density on the surface of a foam while preventing the formation of voids in the interior of the foam, it is insufficient to merely incline the inner surfaces of the frame so that its cross-sectional area is increased toward the outer end, and it is necessary to design the frame so that the inclination angle of each inner surface to the extrusion direction is within the range of from 5° to 30°. It has further been confirmed that it is necessary to cool the inner surfaces and to bring extruded materials in contact with the thus-cooled inner surfaces.

SUMMARY OF THE INVENTION

The present invention relates to:

(1) a method of producing a thermoplastic resin foam which comprises extruding an expandable resin through a plurality of holes bored in a die provided with a frame in an adjacent relation with the extrusion end surface of the die, said frame being adapted to surround the holes, and fusing together the extruded materials from the holes while they are expanded and still softened, wherein the inner surfaces of the frame are inclined so that its cross-sectional area is increased toward the outer end thereof, the inclination angle of the inner surface to the line vertical to the extrusion end surface is maintained within the range of from 5° to 30°, the temperature of the inner surface is maintained lower than the softening temperature of the expandable resin, and the extruded materials are fused together while kept in contact with the inner surfaces of the frame; and (2) a method of producing a thermoplastic resin foam which comprises extruding an expandable resin through a plurality of holes bored in a die provided with a frame in an adjacent relation with the extrusion end surface of the die, said frame being adapted to surround the holes, and fusing together the extruded materials from the holes while they are expanded and still softened, wherein the inner surfaces of the frame are inclined so that its cross-sectional area is increased toward the outer end thereof, the inclination angle of the inner surface to the line vertical to the extrusion end surface is maintained within a range of from 5° to 30°, the temperature of the inner surface is maintained lower than the softening temperature of the expandable resin, the distance from the holes existing in the peripheral portion of the extrusion end surface to the inner surface of the frame is made to differ from place to place, and the extruded materials are fused together while kept in contact with the inner surfaces of the frame.

BRIEF DESCRIPTION OF THE DRAWINGS

FIG. 1 is a cross-sectional view illustrating an embodiment of the method of the invention;

FIG. 2 is a front view of a frame 4 of FIG. 1;

FIG. 3 is a transverse-sectional view of a foam as produced using the frame of FIG. 2;

FIG. 4 is a view of a model to explain the hole distribution area;

FIGS. 5, 7, 9, and 11 are each a front view of a frame as used in the present invention; and FIGS. 6, 8, 10, and 12 are cross-sectional views of foams as produced using the frames of FIGS. 5, 7, 9, and 11, respectively.

DETAILED DESCRIPTION OF THE INVENTION

Figure 7:
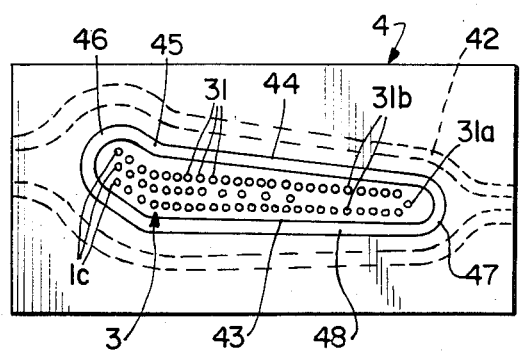

The present invention, in one embodiment, relates to a method of producing a thermoplastic resin foam which comprises extruding an expandable resin through a plurality of holes bored in a die provided with a frame in an adjacent relation with the extrusion end surface of the die, said frame being adapted to surround the holes, and fusing together the extruded materials from the holes while they are expanded and still softened, wherein the inner surfaces of the frame are inclined so that its cross-sectional area is increased toward the outer end thereof, the inclination angle of the inner surface to the line vertical to the extrusion end surface is maintained within the range of from 5° to 30°, the temperature of the inner surface is maintained lower than the softening temperature of the expandable resin, and the extruded materials are fused together while kept in contact with the inner surfaces of the frame.

An investigation has been made on a location at which the frame is fitted to the extrusion end surface of the die in an adjacent relation. That is, it has been studied whether, in fitting the frame to the extrusion end surface, the inner surfaces of the frame should be placed at an equal distance from the periphery of the holes on the extrusion end surface, or they should be placed in a nearer relation with part of the holes. As a result, it has been confirmed that if the inner surfaces of the frame are positioned in a nearer relation with part of the holes existing on the periphery of the extrusion end surface, there can be formed a thicker skin layer in the nearer areas. Hence, the thickness of the skin layer can be controlled appropriately and optionally if the distance from the holes on the periphery of the extrusion end surface to the inner surface of the frame is made to differ from place to place; that is, the time taken for the extruded material to reach the inner surface of the frame is made to differ from place to place.

In another embodiment, therefore, the present invention relates to a method of producing a thermoplastic resin foam which comprises extruding an expandable resin through a plurality of holes bored in a die provided with a frame in an adjacent relation with the extrusion end surface of the die, said frame being adapted to surround the holes, and fusing together the extruded materials from the holes while they are expanded and still softened, wherein the inner surfaces of the frame are inclined so that its cross-sectional area is increased toward the outer end thereof, the inclination angle of the inner surface to the line vertical to the extrusion end surface is maintained within the range of from 5° to 30°, the temperature of the inner surface is maintained lower than the softening temperature of the expandable resin, the distance from the holes existing in the peripheral portion of the extrusion end surface is made to differ from place to place, and the extruded materials are fused together while kept in contact with the inner surface of the frame.

The term "softening temperature" as used herein refers to a Vicat softening point as determined in ASTM D1525.

The present invention will hereinafter be explained in detail with reference to the accompanying drawings wherein:

In FIG. 1, the reference numeral 1 indicates an extruder; 2, a die; 3, a resin extrusion end plate of the die 2; 4, a frame; 5, a sizing die; 6, a water bath; 7, a foam; 31, a hole through which a resin is extruded; 41, a cavity; 42, a medium path; and 71 to 73, extruded materials.

In accordance with the method of the invention, an expandable resin containing a foaming agent is introduced under pressure into the die 2 from the extruder 1 and extruded through the holes 31—31 of the extrusion end plate 3 in the inside of the frame 4 as the extruded materials 71 to 73. Then, the extruded materials 71 to 73 undergo foaming and increase their volumes. Of the extruded materials 71 to 73, the outermost layers, extruded materials 71 and 73, come into contact with the inner surfaces of the frame 4 and are pressed thereto. As a result, the extruded materials 71 to 73 are fused together.

The frame 4 has a front structure as shown in FIG. 2. A cooling medium is circulated through the medium path 42 and cools the inner surfaces of the frame 4. The frame 4 is opened at both ends; that is, it has an opening 43 at the inlet side and an opening 44 at the outlet side, and is composed of an upper plate 45, a left side plate 46, a right side plate 47, and a lower plate 48. These plates 45 to 48 constitute the inner surfaces of the frame 4 and extend forward, and make an angle of inclination of from 5° to 30° to the line vertical to the extrusion end surface of the extrusion end plate 3.

The frame 4 of FIG. 2 is explained below in greater detail.

The inlet side opening 43 and the outlet side opening 44 are both regular squares and are vertical to an axial line passing through the centers of the openings. Hence, the ridge lines formed between the upper plate 45, the left side plate 46, the right side plate 47 and the lower plate 48 are such that, when extended backward, they intersect on the axial line. The upper plate 45 and the lower plate 48 are in a symmetrical relation and incline at an angle of 6° to the axial line. Also, the left side plate 46 and the right side plate 47 are in a symmetrical relation, and they incline at an angle of 20° to the axial line. In general, when the opposite plates are spaced apart a great distance, the angle of inclination is increased, whereas when they are spaced apart a small distance, the angle of inclination is decreased. In any case, the angle of inclination is maintained within the range of from 5° to 30°, and the inner surfaces are disposed so that the area of the outlet side opening 44 is greater than that of the inlet side opening 43; that is, the cross-sectional area of the frame 4 is increased toward the outer end.

The frame 4 as shown in FIG. 2 is fitted to the extrusion end plate 3, which is then fitted to the die 2. While circulating a cooling oil through the medium path 42, an expandable resin is extruded from the extruder 1. Then, the extruded materials 71 to 73 travel through the frame 4. During this travel, the extruded materials undergo foaming; the extruded material 71 is cooled on coming into contact with the upper plate 45 of the frame 4, and the extruded material 73 is cooled on coming into contact with the lower plate 48 of the frame 4. Hence, in the extruded materials 71 and 73, foaming is depressed which results in the formation of a skin layer of high density, i.e., low degree of expansion. On the other hand, since the extruded material 72 existing in the inner portion is prevented from coming into contact with the inner surfaces of the frame 4, it does not form a skin layer of high density.

In the frame 4 as shown in FIG. 2, as described above, the inner surfaces of the frame 4 are disposed so that its cross-sectional area is increased toward the outer end. Hence, any of the extruded materials 71 to 73 is allowed to undergo foaming and expand. Hence, even if a skin layer of high density is formed, it does not prevent the extruded materials 71 to 73 from travelling through the frame 4. This will lead to a smooth molding operation. Further, since the angle of inclination of each inner surface is maintained within the range of from 5° to 30° to the axial line, the rate of foaming and expansion of the expandable resin is in good harmony with the rate of extrusion of the expandable resin. Hence, the desired high density skin layer can be provided on the surface of a foam. Further, since the outermost layers, extruded materials 71 and 73, are pressed by the inner surfaces of the frame 4, they are well fused together with the extruded material 72 existing in the inner portion and thus there can be formed the foam 7 which is strong as a whole. During this process, no gas is trapped between the extruded materials 71 to 73 and thus the fusion is not prevented.

The thus-formed foam 7 is shown in FIG. 3. In the foam 7 of FIG. 3, the extruded materials 71 to 73 are strongly fused together with no voids therebetween. Further, in the surface of the foam 7, a skin layer 7H of high density is formed. Hence, the surface of the foam 7 is scratched only with difficulty. Further, in the foam 7, a big void is not formed between the extruded materials 71 to 73. Hence, the foam 7 is a high quality one.

The relation between the holes 31—31 bored in the extrusion end plate 3 and the cross-section of the foam is such that the hole distribution area constitutes not greater than 70%, preferably not greater than 50% of the cross-sectional area of the foam. The term "hole distribution area" as used herein refers to an area of a polygon as obtained by linking the centers of holes 31—31 positioned at the periphery. In case that the holes 31—31 are regularly disposed as shown in FIG. 4, the hole distribution area refers to an area of the hatched zone. The above limitation that the hole distribution area constitutes not greater than 70% of the cross-sectional area of the foam means that since the expandable resin expands beyond the foaming fine line space, the degree of foaming is great. In conventional foaming methods, particularly those methods to provide a skin layer of high density, since the proportion of the hole distribution area to the cross-sectional area of the foam is greater than 70%, voids are formed in the interior of a molded product and wrinkles occur in the surface thereof. In the method of the present invention, the proportion is not greater than 70% and preferably not greater than 50%. In general, as the density of a molded product being produced is high, the proportion is increased.

The length of the frame 4 in a direction vertical to the extrusion end surface is from 10 to 50 mm. If the length of the frame 4 in the above-defined direction is longer than 50 mm, the length of the inner surface with which the extruded material is in contact during its travel through the frame is increased and hence a high take-off tension may be applied to pull the extruded material, producing problems such as breakage or damage of the foam. On the other hand, if the length is shorter than 10 mm, the length of the inner surface with which the extruded material is in contact is insufficient and the effect of producing a high density skin layer cannot be obtained.

Various thermoplastic resins can be used in the method of the present invention. For example, polystyrene, polymethyl methacrylate, polycarbonates, polypropylene, polyethylene, polyvinyl chloride, and polyamides can be used. Particularly preferred are polystyrene and styrene copolymers. These resins are intermingled with foaming agents. Various foaming agents can be used, including solid compounds, such as azodicarbonamide, which when heated, decompose and produce gases, and organic compounds capable of dissolving or swelling the resins and having a boiling point lower than the softening temperature of the resins, such as propane, butane, pentane and various fluorinated hydrocarbons. In the case of styrene- or olefin-based resins, it is preferred to use halogenated aliphatic hydrocarbons, such as trichloromonofluoromethane and dichlorodifluoromethane, in combination with fine powdery talc.

FIG. 5 is a front view of a frame 4 similar to that of FIG. 2. In the frame 4 of FIG. 5, a lower plate 48 is not in a symmetrical relation with an upper plate 45; the angle of inclination of the lower plate 48 is greater than that of the upper plate 45. That is, the upper plate 45 is inclined at an angle of 6° to the line vertical to the extrusion end surface; the left side plate 46 and the right side plate 47, at an angle of 20°; and the lower plate 48, at an angle of 11°. Hence, when the frame 4 is viewed from the front thereof, it looks as if the breadth of the upper plate 45 is the narrowest, that of the lower plate 48 is secondarily narrow, and those of the left side plaet 46 and the right side plate 47 are the broadest.

When an expandable resin is extruded using the frame 4 of FIG. 5 in the same manner as described above, there is produced a foam having a cross-sectional structure as shown in FIG. 6. In the foam 7 of FIG. 6, a high density skin layer 7H with the same thickness as described above is uniformly formed in the surfaces which have been in contact with the upper plate 45, the left side plate 46, and the right side plate 47, and a high density skin layer 7S thinner than the skin layer 7H is formed in the surface which has been in contact with the lower plate 48.

Although FIGS. 2 to 6 illustrate an embodiment in which a typical foam having a rectangular cross-section is molded, the method of the present invention can be applied to the production of foams having complicated cross-sections. FIG. 7 illustrates an embodiment in which a foam having a complicated cross-section is produced.

In FIG. 7, a number of holes 31—31 are bored in an extrusion end plate 3 in a predetermined configuration. The configuration is such that only one hole 31a is bored at the right end, three holes 31c—31c are bored at the left end, and two holes 31b—31b are bored in the intermediate portion. An inlet side opening 43 of the frame 4 is designed so as to surround a number of holes 31—31. The inner surfaces of the frame 4 are constructed by base lines inclining at any point with an angle of 6° relative to a straight line passing through the inlet side opening 43 and vertical to the extrusion end surface. Although the inner surfaces may be divided into an upper surface 45, a left side surface 46, a right side surface 47, and a lower surface 48, there is no clear boundary therebetween. Since the angle of inclination is the same and the thickness of the frame 4 in an extrusion direction is also the same, the upper surface 45, the left side surface 46, the right side surface 47, and the lower surface 48 of FIG. 7 are the same in breadth. Hence, strictly speaking, the outlet opening 44 is not similar in shape to the inlet opening 43.

Figure 8:
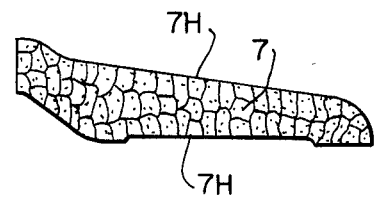

A foam 7 as produced using the frame of FIG. 7 has a shape as shown in FIG. 8, and a skin layer 7H of high density is formed on the entire surface thereof.

Figure 9:
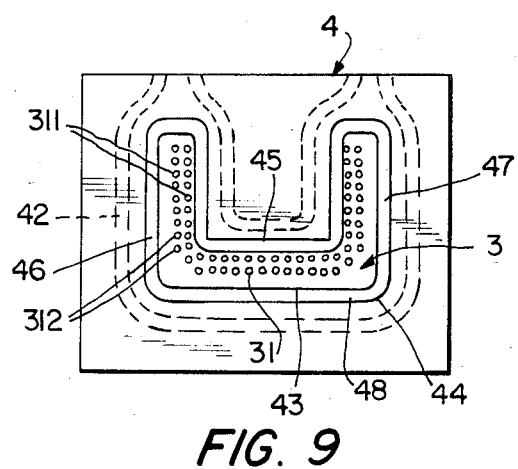

FIG. 9 shows a frame 4 to be used in another embodiment of the invention. In FIG. 9, the holes 31—31 bored in an extrusion end surface 4 are distributed in a U-form. As in the case of the frame of FIG. 7, the inlet opening 43 of the frame 4 is designed so as to surround the holes 31—31. It is also the same as in the case of the frame of FIG. 7 that the inner surfaces 45 to 48 are constructed by base lines having a given angle of inclination, for example, an angle of 6°, relative to a straight line vertical to the extrusion end surface.

The frame 4 of FIG. 9 is different from the frame of FIG. 7 in that the holes 31—31 are not positioned at the center in the direction of breadth of the inlet side opening 43, but are shifted to the inner side. In more detail, the difference resides in that the holes 31—31 are composed of inner side holes 311—311 and outer side holes 312—312, in which the inner side holes 311—311 are provided in an adjacent relation with the inner edge of the inlet side opening 43, whereas the outer holes 312—312 are provided with some distance apart from the outer edge of the inlet side opening 43. Hence, the upper surface 45 connecting to the inner edge is positioned adjacent to the holes 311—311, and all of the left side surface 46, the right side surface 47, and the lower surface 48 are positioned apart from the holes 312—312.

Figure 10:
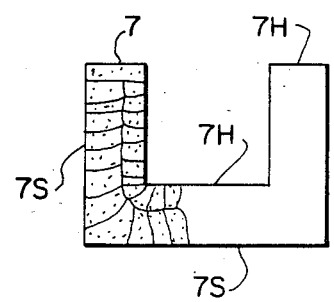

The use of the frame 4 of FIG. 9 provides a foam as shown in FIG. 10. The foam 7 shown in FIG. 10 has a U-shaped cross-section, the inner surface of the U-shaped foam being a skin layer 7H which is large in thickness and is of high density, and the outer surface being a skin layer 7S which is of high density, but is reduced in thickness. The reason for the formation of such a difference in thickness of the skin layer is considered as follows:

Since the holes 311—311 are closer to the inner surface 45, extruded materials extruded from the holes 311—311 come into contact with the inner surface 45 immediately after extrusion and are cooled, as a result of which foaming is controlled. On the other hand, the holes 312—312 are provided with some distance apart from the left side surface 46, the right side surface 47, and the lower surface 48. Hence, extruded materials leaving the holes 312—312 come into contact with the left side surface 46, the right side surface 47, and the lower surface 48 some time after extrusion, and thus they are cooled after foaming proceeds to a certain extent. As a result, the foaming is less controlled.

The embodiment described above is effective to produce foams having a solid skin layer only at one surface. In the present invention, the formation of the desired high density skin layer can also be facilitated by changing the inclination angle of the inner surface of the frame 4.

In accordance with the present invention, an expandable resin is extruded through a plurality of holes bored in a die and extruded materials thus produced are fused together to form a foam. In this case, since a frame is provided in an adjacent relation with the extrusion end surface of the die in such a manner that it surrounds the holes, and the extruded materials are fused together in the frame, the desired high density skin layer can be formed on the foam. This is remarkable as compared with foams as produced by extruding an expandable resin through a single big hole bored in a die. In a case in which an expandable resin is extruded through such a single big hole, an extruded material is deformed by foaming after it leaves the die and, therefore, in forming a skin layer, it is not possible to form the skin layer uniformly. On the other hand, in the method of the present invention, an expandable resin is extruded through a plurality of holes, and an extruded material can be placed at the desired location. Hence, the method of the invention permits the formation of the desired skin layer. Furthermore, in the method of the present invention, the inner surfaces of the frame are inclined and designed so that the cross-sectional area of the frame is increased toward the outer end thereof, and the angle of inclination of the inner surfaces is controlled within the range of from 5° to 30°. Hence, foaming occurs sufficiently to the interior of extruded material in the frame and prevents the formation of voids between the extruded materials. Thus, a high quality foam not having a void in the interior thereof can be produced.

Furthermore, in accordance with the method of the invention, high density skin layers having different thicknesses can be provided at the desired places by changing the angle of inclination of the inner surfaces within the range of from 5° to 30°.

The thickness of the skin layer can be increased by changing from place to place the distance from holes existing on the periphery to the inner surfaces of the frame, in more detail, by decreasing the distance from the holes to the inner surfaces. Conversely, by increasing the distance from the holes to the inner surfaces, the thickness of the skin layer can be reduced. The method of the present invention produced advantages as described above.

The present invention is described in greater detail with reference to the following Examples. All parts are by weight unless otherwise indicated.

EXAMPLE 1

In this example, polystyrene was used as a material, and an apparatus and a frame as shown in FIGS. 1 and 2, respectively, were used to produce a foam as shown in FIG. 3.

Polystyrene (100 parts) was mixed with 1.5 parts of fine powdery talc as a bubble-controlling agent and 0.1 part of brown pigment. The resulting mixture was introduced in an extrusion system consisting of an extruder of bore diameter 40 mm and an extruder of bore diameter 50 mm connected to each other, and heated to 190°–220° C. A foaming agent was introduced under pressure at a suitable point of the extruder of bore diameter 40 mm. The mixture was extruded in an amount of 15 kg per hour. As the foaming agent, a 1:1 mixture of trichloromonofluoromethane (Furon 11) and dichlorodifluoromethane (Furon 12) was used, and it was added in an amount of about 1.5 parts per 100 parts of the resin.

The die 2 was heated to 150°–160° C. by a plate heater. An oil maintained at 60° C. was circulated through the medium path 42 of the frame 4. In order to avoid the conduction of heat from the die 2, the cavity 41 was provided.

The structure of the extrusion end plate 3 was as follows:

The diameter of each hole 31 was 1.6 mm, and its length in a direction of movement was 10 mm. These holes 31—31 were bored in the extrusion end plate 3 at regular intervals of 2 mm; the number of holes in the vertical direction was 4 and that in the horizontal direction was 17. The total number of the holes bored in the extrusion end plate 3 was 68. The hole distribution area of the extrusion end plate was 1.92 cm².

The thickness of the frame 4 in a direction vertical to the extrusion end surface was 20 mm, and there was formed therein a rectangular inlet side opening 43 measuring 8 mm long and 34 mm wide. In connection with the inner surfaces of the frame 4, the upper surface 45 and the lower surface 48 were both inclined at an angle of 6° to a direction vertical to the extrusion end surface, and the left side surface 46 and the right side surface 47 were both inclined at an angle of 20° to the direction as described above; the cross-sectional area of the frame was increased toward the outer end. The outer end was the outlet side opening 44. The inner surfaces of the frame 4 were coated with Teflon (tetrafluoroethylene resin).

Extruded materials from the holes 31—31 were expanded, fused together by bringing them into contact with the inner surfaces 45 to 48 of the frame 4, shaped in the desired form by passing through the sizing dye 5, and then cooled by immersing in the water bath 6 to produce the foam 7.

The cross-section of the foam 7 was rectangular as shown in FIG. 3; the long side was 50 mm and the short side was 12 mm. Thus, the cross-sectional area was 6 cm², and the proportion of the hole distribution area to the cross-sectional area of the foam was 32%. That is, the hole distribution area constituted 32% of the cross-sectional area of the foam.

On the surface of the foam 7, the fused surfaces between the extruded materials appeared in a regularly grained form, but the fused surfaces were not depressed, and the high density skin layer 7H was formed uniformly over the entire surface of the foam. The surface of the foam was scratched only difficultly, and its appearance was good. The average density of the foam was 0.35 g/cm³, and the hardness was 50-60 as determined by a Shore D hardness meter. Thus, the foam was hard irrespective of the fact that it was an expanded material.

EXAMPLE 2

In this example, the procedure of Example 1 was repeated except that the extrusion end plate 3 and the frame 4 were replaced by the ones as shown in FIG. 5.

In the extrusion end plate 3, holes 31—31 having a diameter of 1.6 mm and a length in the direction of extrusion of 10 mm were bored at regular intervals of 2 mm; the number of holes in the vertical direction was 3 and that in the horizontal direction was 17. Thus, the total number of holes bored in the extrusion end plate 3 was 51. The hole distribution area of the plate 3 was 1.28 cm².

The thickness of the frame 4 in the direction of extrusion was 20 mm, and there was formed therein a rectangular inlet side opening 43, the long and short sides being 34 mm and 6 mm, respectively. In connection with the inner surfaces of the frame, the upper surface 45 was inclined at an angle of 6°, the left side surface 46 and the right side surface 47 were inclined at an angle of 20°, and the lower surface 48 was inclined at an angle of 11°, all being to a straight line vertical to the extrusion end surface. Thus, the cross-sectional area of the frame was increased toward the outer end thereof. The outlet side opening 44 was of the same size as the outlet side opening of the frame 4 as used in Example 1.

The same resin composition as used in Example 1 was introduced in the same extruder as used in Example 1 and extruded from the extrusion end plate 3 as described above to the frame 4 as also described above to produce a foam. This foam was similar to that of Example 1, and its transverse-sectional area was 6 cm². Thus, the proportion of the hole distribution area to the cross-sectional area of the mold was 21.3%.

The foam as produced in this example was greatly different from the foam of Example 1 in the following respect. In the foam 7 of this example, as shown in FIG. 6, a thin, high density skin layer 7S was formed only on one surface, and the surface hardness of the surface was not so great. In more detail, the foam surface 7H as produced by contacting with the upper surface, the left side surface 46, and the right side surface 47 had a Shore D hardness of 45-50, whereas the foam surface 7S as produced by contacting with the lower surface 48 had a Shore D hardness of 30-35. The average density of the foam was 0.33 g/cm³. The foam of this example was equivalent to that of Example 1 in other respects and thus it was of high quality.

EXAMPLE 3

In this example, the extrusion end plate 3 and the frame 4 as shown in FIG. 7 were used.

To a resin mixture of 90 parts of polystyrene and 10 parts of high-impact polystyrene were added 1.0 part of fine powdery talc and 0.1 part of brown pigment. The resulting mixture was introduced into an extrusion system consisting of an extruder of bore diameter 40 mm and an extruder of bore diameter 50 mm connected to each other. As a foaming agent, about 2.0 parts of Furon 12 was introduced under pressure into the extrusion system. The mixture was extruded in an amount of 20 kg per hour. The die 2 was maintained at 145°-150° C., and an oil maintained at 50° C. was circulated through the frame 4.

In the extrusion end plate 3, holes 31—31 having a diameter of 1.6 mm were bored at nearly equal intervals in a configuration as shown in FIG. 7, and the total number of the holes was 60. In more detail, the holes were arranged in 3 columns in both directions at the left end of the plate; there was only a single hole at the right end; and at the intermediate portion, the holes were arranged in 3 or 2 columns. The length in the vertical direction was reduced steadily from the left side to the right side, and the left end was bent somewhat upward.

The inlet side opening 43 was positioned at different distances from the holes 31—31 existing on the periphery. In more detail, the left and right edges of the opening 43 were positioned at some distance from the holes 31c and 31a, respectively, but the upper and lower edges of the opening 43 were positioned close to the holes 31b. This was based on the anticipation that in foaming of extruded material, it would greatly broaden in the horizontal direction, but would not broaden so much in the vertical direction.

Using the extrusion end plate 3 and the frame 4 as described above, the resin composition was extruded to produce a foam as shown in FIG. 8. The transverse-sectional area of the foam was 5.5 cm². Thus, the proportion of the cross-sectional area of the foam to the hole distribution area was about 33%. The average density of the foam was 0.30 g/cm³, and a high density skin layer 7H was formed over the entire circumference. The surface hardness was 45-50 as represented in terms of a Shore D hardness.

EXAMPLE 4

Figure 11:
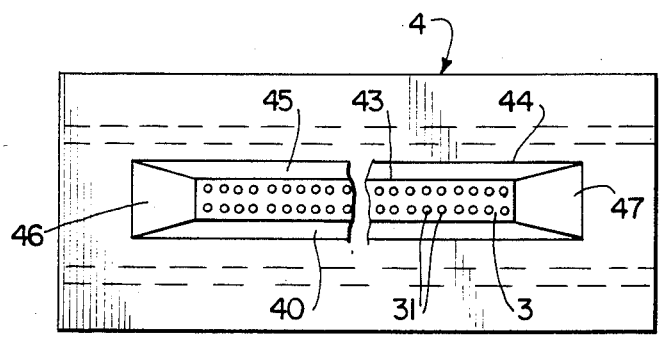

In this example, the extrusion end plate 3 and the frame 4 as shown in FIG. 11 were used.

Polypropylene was used as a resin, and 2.0 parts of fine powdery talc was mixed with 100 parts of polypropylene. The resulting mixture was introduced into an extruder of bore diameter 40 mm and also, as a foaming agent, about 3 parts of butane was introduced thereinto under pressure. The mixture was extruded in an amount of 10 kg per hour. The die 2 was maintained at 160°–170° C., and an oil maintained at 80° C. was circulated through the frame 4.

In the extrusion end plate 3, as shown in FIG. 11, holes 31—31 having a diameter of 1.8 mm were bored at regular intervals of 2.5 mm; the number of holes in the vertical direction was 2 and that in the horizontal direction was 48. Thus, the total number of holes 31—31 was 96, and the hole distribution area was 2.93 cm$^2$.

The thickness of the frame 4 in the direction of extrusion was 30 mm, and the inlet side opening 43 was in a rectangular form measuring 6.5 mm long and 120 mm wide. In connection with the inner surfaces of the frame 4, the upper surface 45 and the lower surface 48 were inclined at an angle of 6° to a straight line vertical to the extrusion end surface, and the left surface 46 and the right surface 47 were inclined at an angle of 20° to the same straight line as defined above; the cross-sectional area of the frame 4 was increased toward the outer end.

Figure 12:
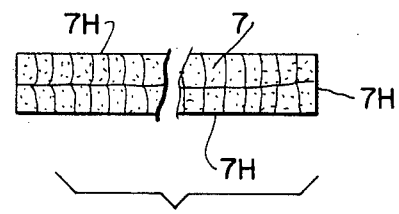

Using the apparatus as described above, the resin composition was extruded to produce the foam 7 as shown in FIG. 12. The transverse-section of the foam 7 was rectangular; the long side was 140 mm and the short side was 10 mm. Thus, the cross-sectional area of the foam was 14 cm$^2$, and the proportion of the hole distribution area to the cross-sectional area of the foam was 20.9%. The average density of the foam 7 was 0.19 g/cm$^2$. A high density skin layer was formed on the entire circumference, and there was no void in the interior of the foam. Thus, the foam had a good appearance and was of high quality.

EXAMPLE 5

The procedure of Example 1 was repeated except that the extrusion end plate 3, the frame 4, and the sizing die 5 were changed, and that the proportion of the hole distribution area of the plate 3 to the cross-sectional area of the foam was made greater than in the other examples.

In the extrusion end plate 3, holes 31—31, the diameter being 1.6 mm and the length in the direction of extrusion being 10 mm, were bored at equal intervals of 2 mm; the number of holes in the vertical direction was 5 and that in the horizontal direction was 25. Thus, the total number of the holes was 125. The hole distribution area of the plate 3 was 3.84 cm$^2$.

The thickness of the frame 4 in the direction of extrusion was 20 mm, and the inlet opening 43 was in a rectangular form, in which the long side was 59 mm and the short side was 12 mm. The upper surface 45, the left side surface 46, the right side surface 47, and the lower surface 48 were all inclined at an angle of 8°, and thus the cross-sectional area was increased toward the outer end. There was the outlet side opening 44 at the outer end. The inner surfaces of the frame 4 were subjected to nickel plating.

The same resin composition as used in Example 1 was introduced in the same extruder as used in Example 1, extruded from the extrusion end plate 3 as described above into the frame 4 as described above in an amount of 7 kg per hour, and taken through the sizing die 5 to produce the foam 7.

The foam 7 had a rectangular cross-section in which the long side was 60 mm and the short side was 10 mm. Thus, the cross-sectional area of the foam was 6 cm$^2$, and the proportion of the hole distribution area to the cross-sectional area of the foam was 64%.

The average density of the foam as produced above was 0.4 g/cm$^3$, and as in the case of Example 1, the high density skin layer 7H was formed on the entire surface of the foam.

However, if the amount of the material being extruded was increased to at least 15 kg per hour, a high density skin layer was not formed sufficiently on the surface of the foam 7, and no high quality foam was produced.

While the invention has been described in detail and with reference to specific embodiments thereof, it will be apparent to one skilled in the art that various changes and modifications can be made therein without departing from the spirit and scope thereof.

What is claimed is:

1. A method for producing a thermoplastic resin foam which comprises extruding an expandable resin through a plurality of holes bored in a die which is provided with a frame in an adjacent relation with the extrusion end surface thereof, said frame being adapted to surround the holes, and fusing together the extruded materials from the holes while they are expanded and still softened, wherein the inner surfaces of the frame are inclined so that its cross-sectional area is increased toward the outer end thereof, the angle of inclination of the inner surface to a straight line vertical to the extrusion end surface is maintained within the range of from 5° to 30°, the temperature of the inner surface is maintained lower than the softening temperature of the expandable resin, and the extruded materials are fused together while kept in contact with the inner surfaces of the frame.

2. The method as claimed in claim 1, wherein the thickness of the frame in the direction vertical to the extrusion end surface is at least 10–50 mm.

3. The method as claimed in claim 1, wherein the angle of inclination of the inner surface is changed depending on the location thereof.

4. A method for producing a thermoplastic resin foam which comprises extruding an expandable resin through a plurality of holes bored in a die which is provided with a frame in an adjacent relation with the extrusion end surface thereof, said frame being adapted to surround the holes, and fusing together the extruded materials from the holes while they are expanded and still softened, wherein the inner surfaces of the frame are inclined so that its cross-sectional area is increased toward the outer end thereof, the angle of inclination of the inner surface to a straight line vertical to the extrusion end surface is maintained within the range of from 5° to 30°, the temperature of the inner surface is maintained lower than the softening temperature of the expandable resin, the distance from the holes existing in the peripheral portion of the extrusion end surface to the inner surface of the frame is made to differ from place to place, and the extruded materials are fused together while kept in contact with the inner surface of the frame.

5. The method as claimed in claim 4, wherein the thickness of the frame in the direction vertical to the extrusion end surface is at least 10-50 mm.

6. The method as claimed in claim 4, wherein the angle of inclination of the inner surface is changed depending on the location thereof.

7. The method as claimed in claim 1, wherein a hole distribution area constitutes 70% or less of the cross-sectional area of the foam, the hole distribution area being an area of a polygon obtained by linking the centers of the holes located at the periphery of the die.

8. The method as claimed in claim 4, wherein a hole distribution area constitutes 70% or less of the cross-sectional area of the foam, the hole distribution area being an area of a polygon obtained by linking the centers of the holes located at the periphery of the die.

* * * * *